United States Patent
Gammon

(10) Patent No.: US 6,811,196 B2
(45) Date of Patent: Nov. 2, 2004

(54) VEHICLE CARGO MANAGEMENT APPARATUS HAVING MOVABLE CARGO SUPPORT ARM

(75) Inventor: Jim Gammon, Troy, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/640,160

(22) Filed: Aug. 13, 2003

(65) Prior Publication Data

US 2004/0135390 A1 Jul. 15, 2004

Related U.S. Application Data

(60) Provisional application No. 60/439,733, filed on Jan. 13, 2003.

(51) Int. Cl.[7] ............................................... B60R 11/00
(52) U.S. Cl. .................................. 296/37.1; 296/37.16
(58) Field of Search ............................ 296/24.44, 37.1, 296/37.14, 37.16, 193.07; 224/925

(56) References Cited

U.S. PATENT DOCUMENTS

| | | | |
|---|---|---|---|
| 4,222,601 A | * | 9/1980 | White et al. ............. 296/37.16 |
| 4,540,213 A | * | 9/1985 | Herlitz et al. ............... 296/37.5 |
| 4,723,741 A | | 2/1988 | Doering ........................ 248/97 |
| 5,287,971 A | | 2/1994 | Dorman ........................ 211/12 |
| 5,427,288 A | | 6/1995 | Trubee ..................... 224/42.42 |
| 5,484,091 A | * | 1/1996 | Malinowski et al. ........ 224/542 |
| 6,367,746 B1 | | 4/2002 | Webb et al. .................. 248/95 |
| 6,439,633 B2 | * | 8/2002 | Nemoto ................... 296/37.14 |
| 6,502,731 B1 | | 1/2003 | Gehring et al. ............. 224/553 |
| 6,502,885 B1 | * | 1/2003 | Gammon et al. ......... 296/37.13 |
| 6,533,340 B1 | * | 3/2003 | Gaunzon et al. .......... 296/37.16 |

* cited by examiner

*Primary Examiner*—Dennis H. Pedder
(74) *Attorney, Agent, or Firm*—Myers Bigel Sibley & Sajovec

(57) ABSTRACT

Cargo management apparatus include a housing, a movable load floor operably secured to the housing for movement between a closed position and one or more open positions, and a cargo support arm that is movably secured to the vehicle compartment and that is movable between stored and operative positions. The arm includes a plurality of projections extending therefrom in adjacent, spaced-apart relationship. Each projection is configured to support one or more articles suspended therefrom. The arm may be operably connected with the load floor such that, when the arm is moved to an operative position, the load floor can be supported in an open position.

24 Claims, 9 Drawing Sheets

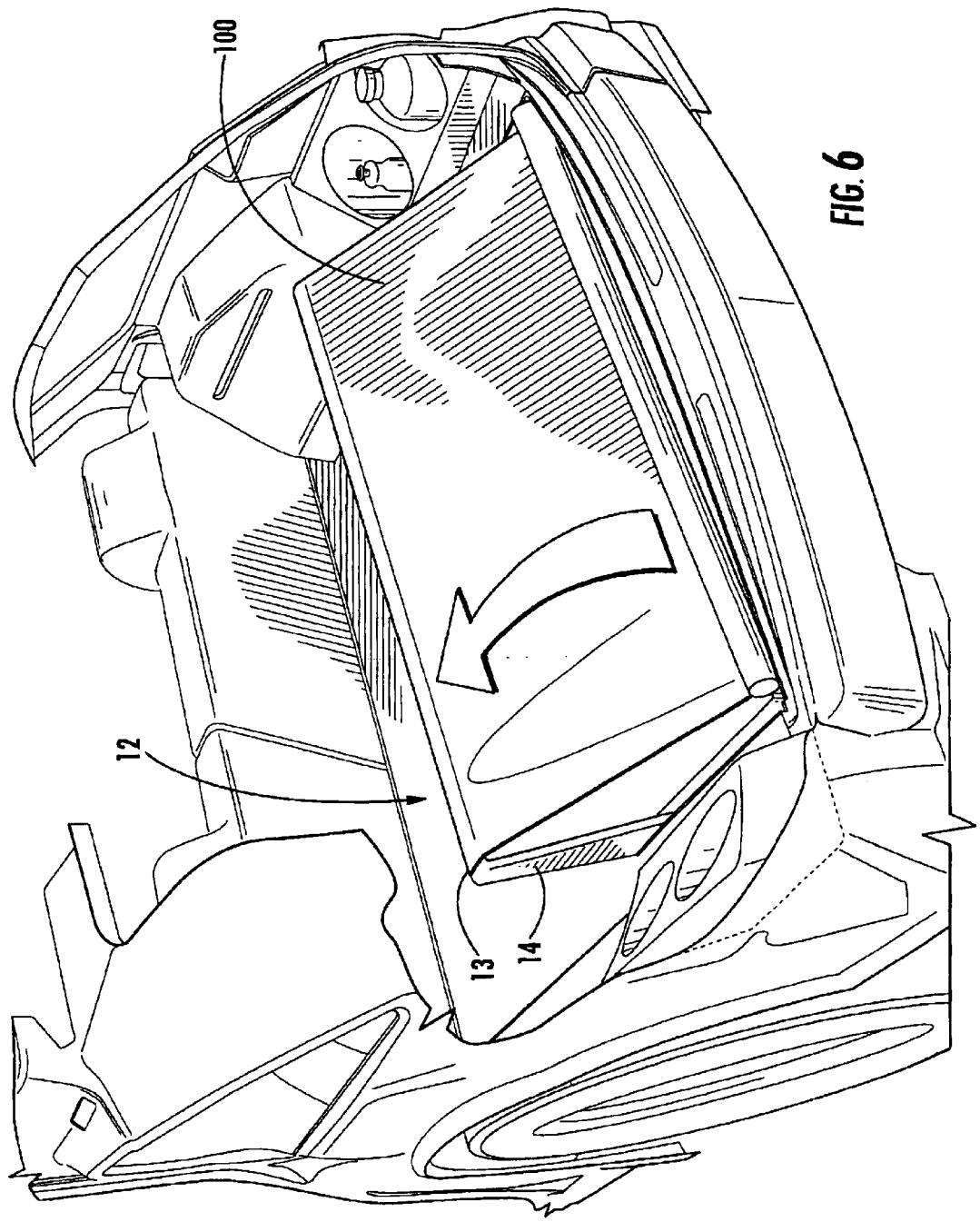

VEHICLE CARGO MANAGEMENT APPARATUS HAVING MOVABLE CARGO SUPPORT ARM

RELATED APPLICATION

This application claims the benefit of U.S. Provisional Application No. 60/439,733, filed Jan. 13, 2003, the disclosure of which is incorporated herein by reference in its entirety as if set forth fully herein.

FIELD OF THE INVENTION

The present invention relates generally to vehicles and, more particularly, to storage apparatus for use within vehicles.

BACKGROUND OF THE INVENTION

Motor vehicles are typically provided with a cargo storage compartment of some type. For example, sedan-style automobiles are conventionally equipped with a trunk. Sport/utility vehicles, mini-vans, station wagons, and other vehicles in which there are two or more rows of seating, are conventionally provided with a cargo storage area behind the last row of seating. Items carried within vehicle cargo storage areas are often free to move about during vehicle operation, which may be undesirable. In addition, in vehicles such as sport/utility vehicles and mini-vans, cargo storage space may be somewhat limited. Accordingly, a need exists to maximize the efficiency and utilization of existing cargo storage space without intruding on passenger space. In addition, a need exists to restrain items from moving about in vehicle cargo storage areas during vehicle operation.

Plastic "T-shirt" style shopping bags are increasingly being utilized by consumers to transport purchased items, such as groceries. Unlike a box or other container with rigid confines, T-shirt style shopping bags typically do not have the ability to maintain any shape apart from the shape of whatever items the bag may be enveloping and typically are unable to prevent items therewithin from causing the shape and position of the bag to shift. While T-shirt style shopping bags may be convenient for personal carrying, because their handles are readily accessible and a plurality of bags can be gripped for carrying, they may be relatively inconvenient when placed within a vehicle. During vehicle operation, items within T-shirt style shopping bags may tend to move, roll about, shift position and fall out as a vehicle moves and turns.

SUMMARY OF THE INVENTION

In view of the above discussion, a cargo management apparatus, according to embodiments of the present invention includes a cargo support arm that is movably secured to a vehicle compartment and is movable between stored and operative positions. The arm is positioned adjacent to the floor of a vehicle compartment when in the stored position and extends outwardly from the floor into a vehicle compartment for convenient use thereof by a user when in the operative position. The cargo support arm includes a plurality of projections extending therefrom in adjacent, spaced-apart relationship. Each projection is configured to support one or more articles (e.g., shopping bags, etc.) suspended therefrom.

A cargo management apparatus according to another embodiment of the present invention includes a housing, a movable load floor operably secured to the housing for movement between a closed position and one or more open positions, and a cargo support arm that is movably secured to the vehicle compartment and that is movable between stored and operative positions. The cargo support arm includes a plurality of projections extending therefrom in adjacent, spaced-apart relationship. Each projection is configured to support one or more articles (e.g., shopping bags, etc.) suspended therefrom. The cargo support arm may be operably connected with the load floor such that, when the arm is moved to an operative position, the load floor can be supported in one or more open positions.

BRIEF DESCRIPTION OF THE DRAWINGS

The accompanying drawing, which forms a part of the specification, illustrates key embodiments of the present invention. The drawing and description together serve to fully explain the invention.

FIGS. 3–6 are perspective views of the cargo management apparatus of FIGS. 2A–2B illustrating various other embodiments of the present invention.

DETAILED DESCRIPTION OF THE INVENTION

Figure 1A:
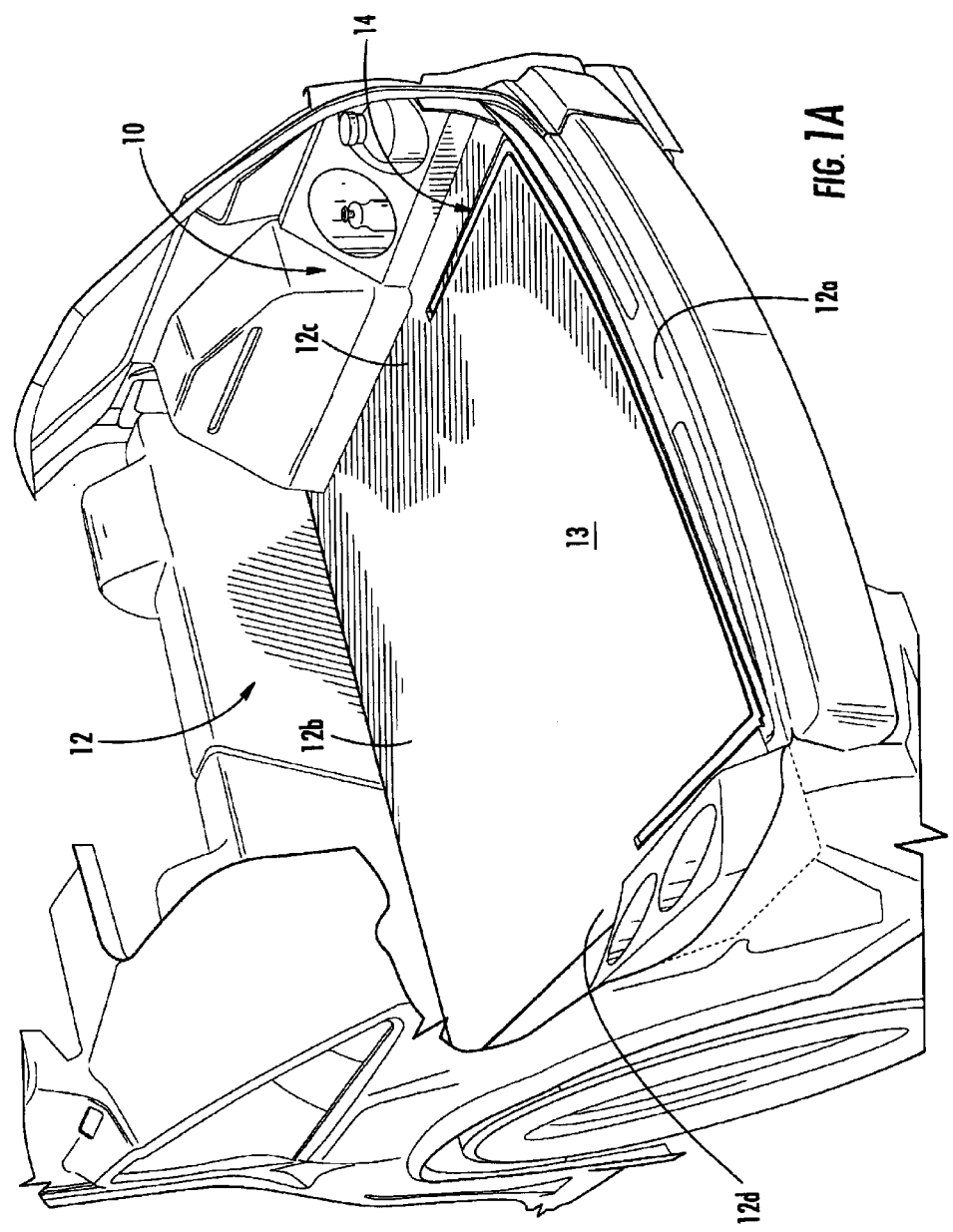
FIGS. 1A–1B are perspective views of a cargo management apparatus, according to an embodiment of the present invention, wherein a cargo support arm is in a stored position (FIG. 1A) and an operative position (FIG. 1B).

The present invention now is described more fully hereinafter with reference to the accompanying drawing, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. Terms such as "upward", "downward", "vertical", "horizontal", and the like, used herein are for the purpose of explanation only.

Figure 1B:
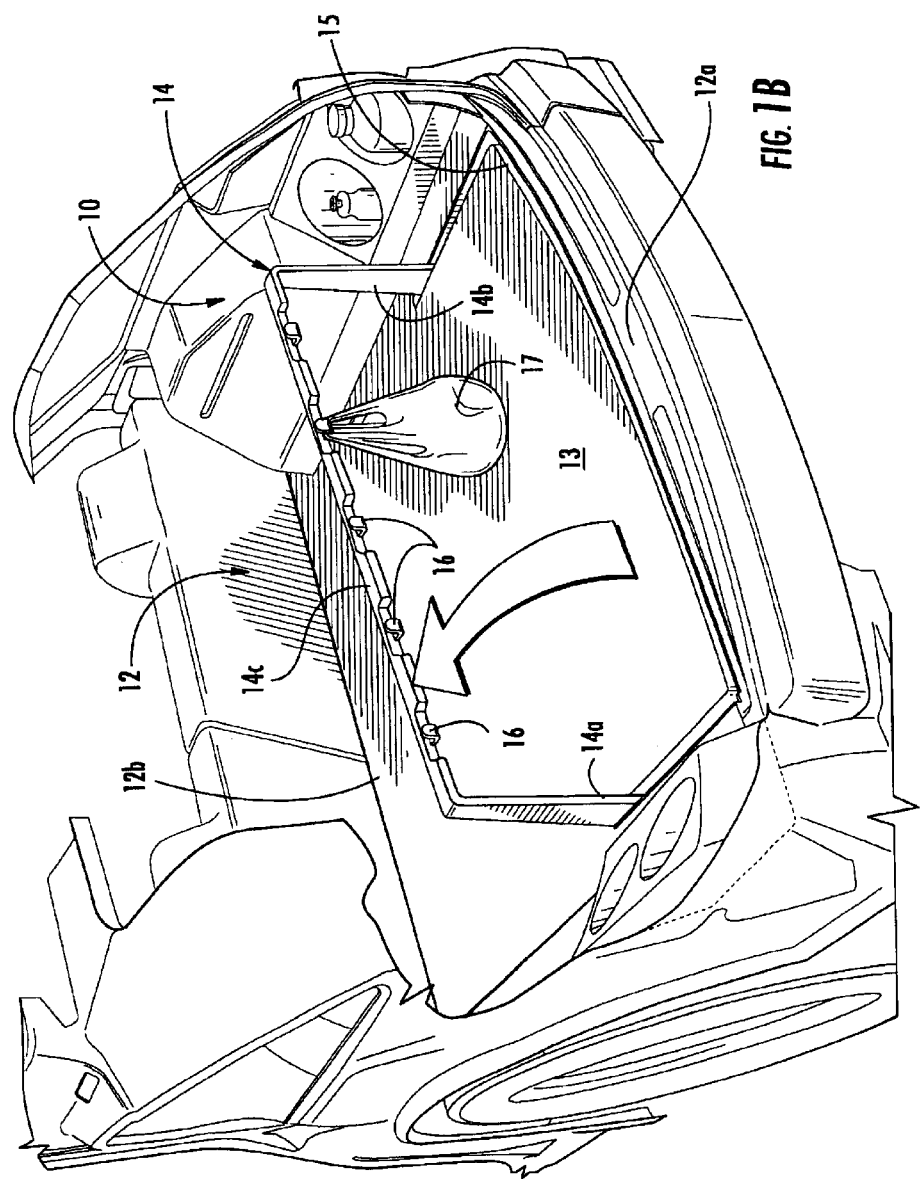

Referring now to FIGS. 1A–1B, a cargo management apparatus 10 for vehicles, according to an embodiment of the present invention, is illustrated. The illustrated cargo management apparatus 10 is configured to be installed within a vehicle compartment 12 (e.g., the trunk portion of sedan-style vehicles, the rear portion of SUVs, station wagons, mini-van vehicles, etc.).

The illustrated cargo management apparatus 10 includes a cargo support arm 14 that is movably secured to the vehicle compartment 12 and that is movable between a stored position (FIG. 1A) and one or more operative positions (FIG. 1B). The arm 14 is positioned adjacent to the floor 13 of the vehicle compartment 12 when in the stored position and extends outwardly from the floor 13 into the vehicle compartment 12 for convenient use thereof by a user when in an operative position. In the illustrated embodiment, a channel 15 is formed within the floor 13 and is configured to receive the arm 14 such that the arm 14 is substantially flush with the floor 13 when in the stored position. However, embodiments of the present invention are not limited to the illustrated configuration and do not require that the arm 14 be substantially flush with a vehicle floor when in a stored position.

The illustrated arm 14 has a generally U-shaped configuration defined by a pair of support members 14a, 14b, each pivotally secured within the vehicle compartment (e.g., via a pivot pin or other type of movable connector that would be known to those skilled in the art), and a cross member 14c extending between the support members 14a, 14b. Embodiments of the present invention are not limited to the illustrated U-shaped configuration of arm 14. Arm 14 may have various shapes and configurations. In addition, embodiments of the present invention may include multiple cargo support arms 14.

In the illustrated embodiment, cross member 14c includes a plurality of projections 16 extending therefrom in adjacent, spaced-apart relationship. Each projection 16 is configured to support one or more articles 17 (e.g., shopping bags, articles, etc.) suspended therefrom (FIG. 1B). In FIG. 1B, arm 14 is supporting a loaded shopping bag 17 by the handles thereof and maintains the loaded shopping bag 17 in an upright position during operation of the vehicle. Projections 16 may have various shapes and configurations and are not limited to the illustrated embodiment. In addition, various numbers of projections 16 may be utilized.

In the illustrated embodiment, when arm 14 is in the stored position, cross member 14c is adjacent the rear portion 12a of vehicle compartment 12. However, embodiments of the present invention are not limited to the illustrated stored position of arm 14. According to an alternative embodiment, arm 14 may be in a stored position such that the cross member 14c is adjacent the front portion 12b of vehicle compartment 12. According to an alternative embodiment of the present invention, cargo support arm 14 may be in a stored position such that cross member 14c is adjacent a side portion 12c, 12d of the vehicle compartment 12.

According to embodiments of the present invention, arm 14 may have more than one operative positions. For example, arm 14 may have operative positions that define one or more angles between about thirty degrees and ninety degrees (30°–90°) relative to the floor 13. The arm 14 may be configured to be positioned at virtually any angle relative to the floor 13. The arm 14 can be movably supported in one or more operative positions via various devices known to those skilled in the art including, but not limited to, ratchet teeth mechanisms, spring actuated mechanisms, and the like.

Figure 2A:
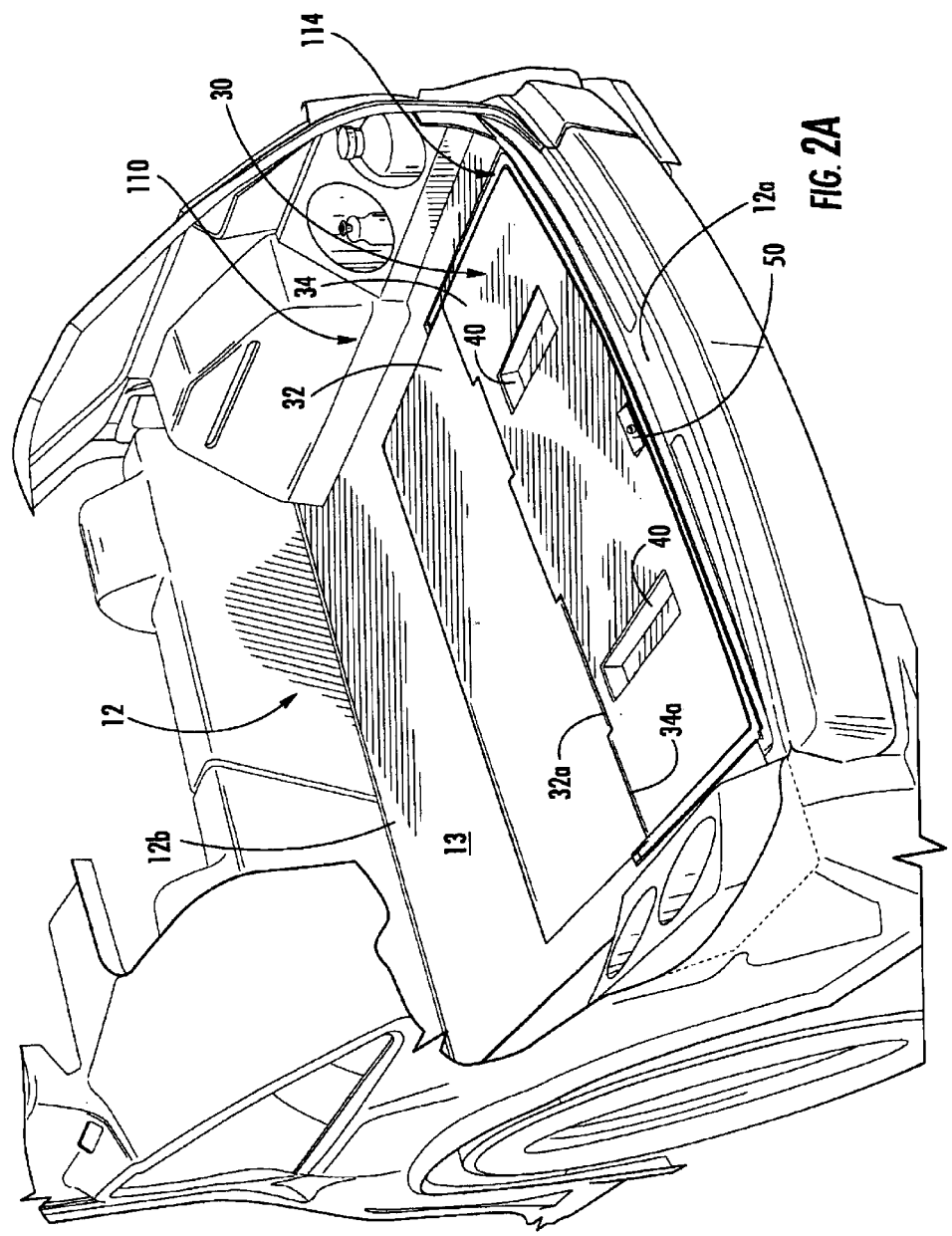
FIGS. 2A–2B are perspective views of a cargo management apparatus, according to another embodiment of the present invention, wherein a movable load floor is in a closed position (FIG. 2A) and supported in an open position by a cargo support arm (FIG. 2B).
Figure 2B:
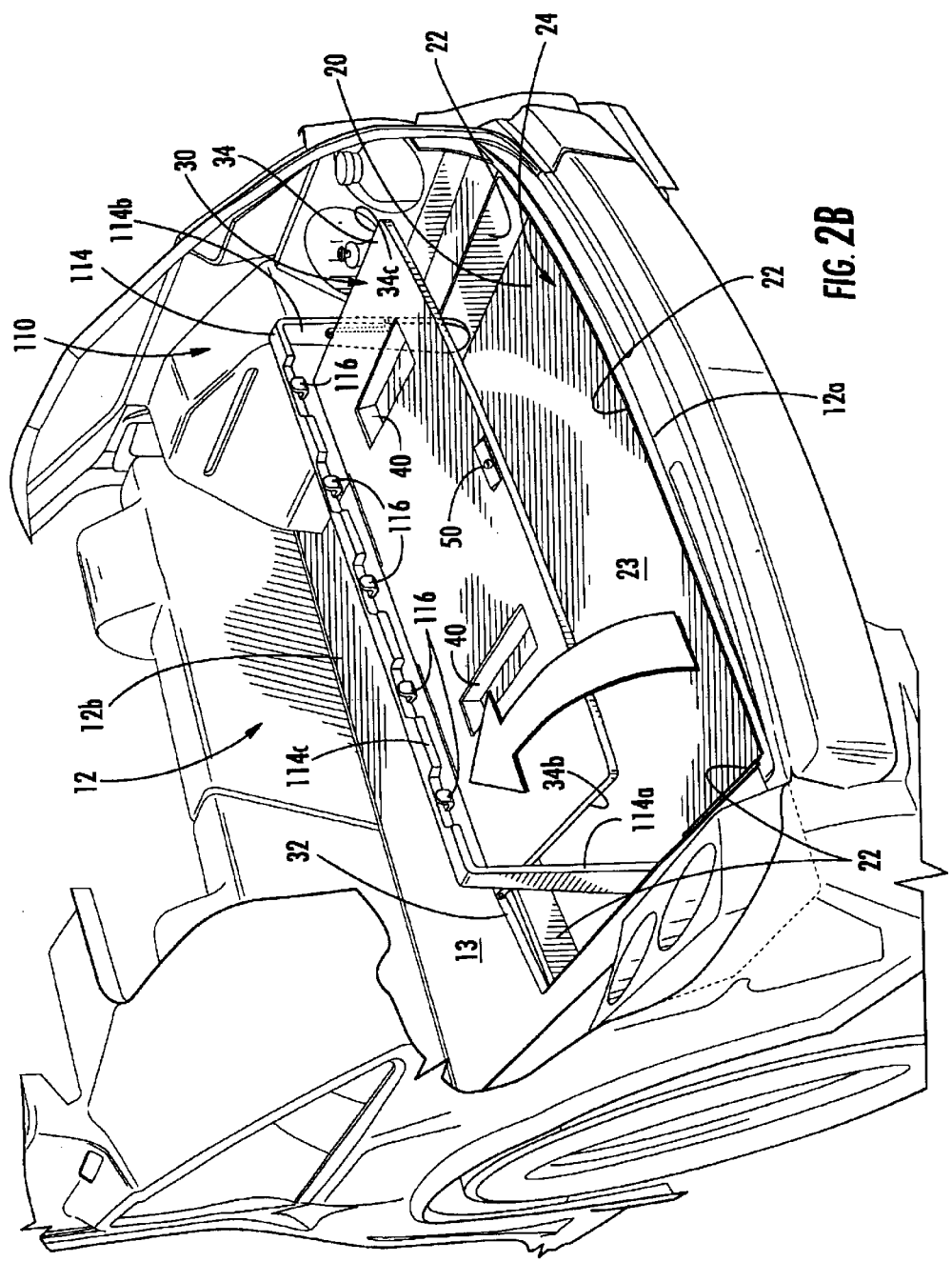
Figure 2C:
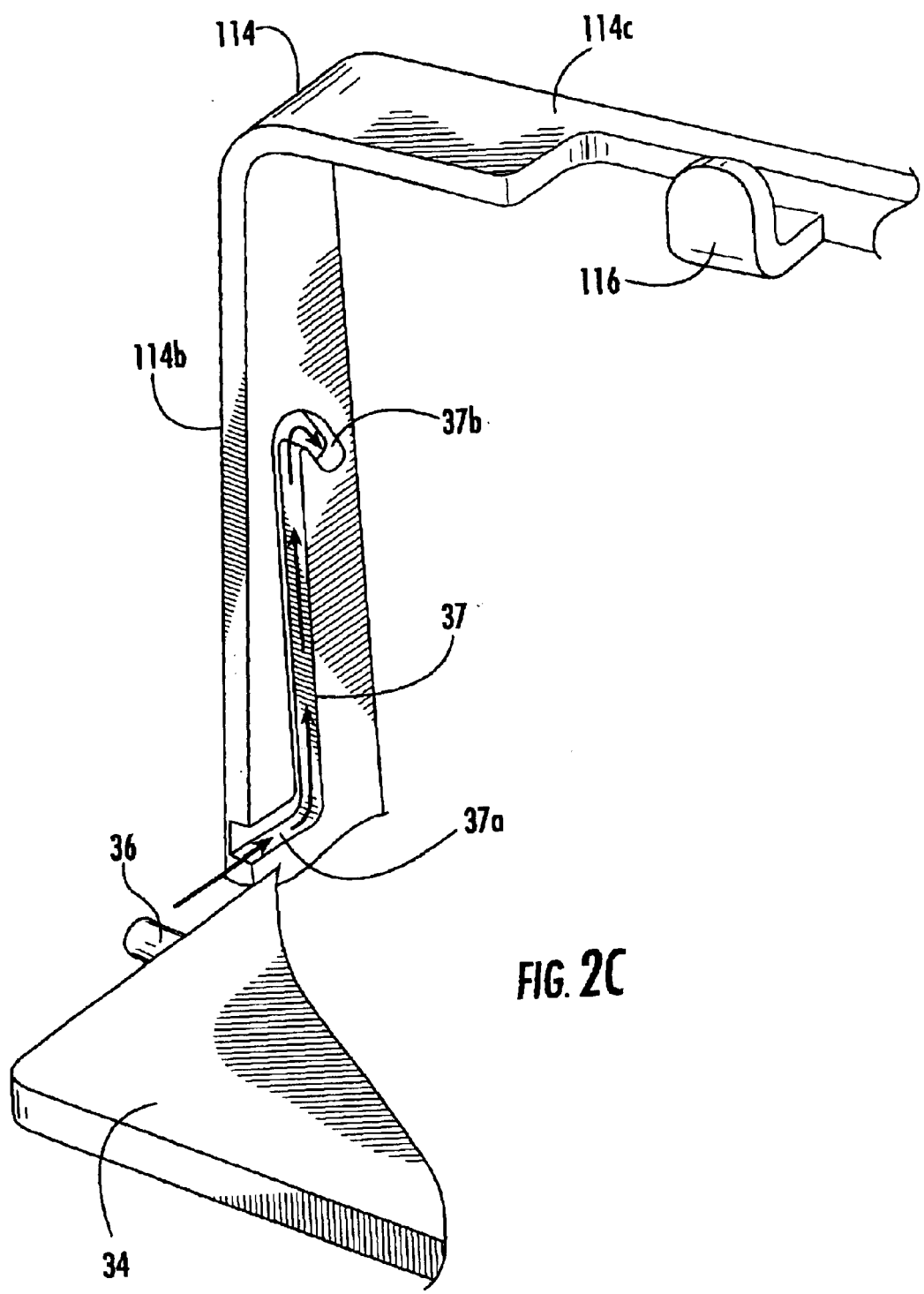
FIG. 2C is an enlarged, partial view of the cargo management apparatus of FIGS. 2A–2B illustrating how the cargo support arm of FIGS. 2A–2B supports the movable load floor in an open position, according to an embodiment of the present invention.

Referring now to FIGS. 2A–2B, a cargo management apparatus 110 for vehicles, according to another embodiment of the present invention, is illustrated. The illustrated cargo management apparatus 110 is configured to be installed within a vehicle compartment 12 (e.g., the trunk portion of sedan-style vehicles, the rear portion of SUVs, station wagons, mini-van vehicles, etc.).

The illustrated cargo management apparatus 110 includes a housing 20 disposed within the floor 13. The housing 20 includes a plurality of walls 22 and a base 23 that define a storage compartment 24. A movable load floor 30 is operably associated with the housing 20 for movement between a closed position (FIG. 2A) and one or more open positions (FIG. 2B).

In the illustrated embodiment, the load floor 30 overlies the storage compartment 24 when in the closed position and permits access to the storage compartment 24 when in an open position. The illustrated load floor 30 includes a pair of movable panels 32, 34 that are pivotally connected to each other along respective edge portions 32a, 34a. The panels 32, 34 may be pivotally connected together in various ways understood by those skilled in the art (e.g., pivot pins, hinges, etc.).

In the illustrated embodiment, when the load floor 30 is moved to an open position (FIG. 2B), the panels 32, 34 move upwardly and slightly toward each other. When the load floor 30 is moved to the closed position (FIG. 2A), the panels 32, 34 are substantially coplanar. The present invention is not limited to the illustrated load floor 30. A load floor having a single panel or more than two panels may be utilized in accordance with alternative embodiments of the present invention.

In the illustrated embodiment, load floor panel 34 includes recessed portions 40 formed therein for receiving and supporting various articles. Embodiments of the present invention are not limited to the illustrated recessed portions 40. Recessed portions having various shapes and sizes may be utilized without limitation. Moreover, various numbers of recessed portions 40 may be utilized. However, the present invention does not require recessed portions 40 in either panel 32, 34.

Also in the illustrated embodiment, the load floor 30 includes a locking mechanism 50 that is configured to maintain the load floor 30 in the closed position and to prevent unauthorized opening of the load floor 30. Various types of locking mechanisms can be utilized as would be understood by those skilled in the art and need not be discussed further herein.

The illustrated cargo management apparatus 110 also includes a cargo support arm 114 that is movably secured to the vehicle compartment 12 and that is movable between a stored position (FIG. 2A) and one or more operative positions (FIG. 2B). Cargo support arm 114 of FIGS. 2A–2B is similar to cargo support arm 14 of FIGS. 1A–1B and is positioned adjacent to a floor 13 of a vehicle compartment 12 when in the stored position and extends outwardly from the floor 13 into a vehicle compartment 12 for convenient use thereof by a user when in one or more operative positions. In the illustrated embodiment, the arm 114 is substantially flush with the floor 13 when in the stored position. However, embodiments of the present invention do not require that the arm 114 be flush with a floor of a vehicle when in a stored position.

The illustrated arm 114 has a generally U-shaped configuration defined by a pair of support members 114a, 114b, each pivotally secured within the vehicle compartment (e.g., via a pivot pin or other type of movable connector known to those skilled in the art), and a cross member 114c extending between the support members 114a, 114b. Embodiments of the present invention are not limited to the illustrated U-shaped configuration of arm 114. Arm 114 may have various shapes and configurations. In addition, there may be multiple arms 114.

In the illustrated embodiment, cross member 114c includes a plurality of projections 116 extending therefrom in adjacent, spaced-apart relationship. Each projection 116 is configured to support one or more articles 17. For example, each projection can support one or more loaded shopping bags 17 by the handles thereof and maintain the one or more loaded shopping bags 17 in an upright position during operation of the vehicle. Projections 116 may have various shapes and configurations and are not limited to the illustrated embodiment. In addition, various numbers of projections 16 may be utilized.

In the illustrated embodiment, when arm 114 is in the stored position, cross member 114c is adjacent the rear portion 12a of vehicle compartment 12. However, embodiments of the present invention are not limited to the illustrated stored position of arm 114. According to an alternative embodiment, arm 114 may be in a stored position such that the cross member 114c is adjacent the front portion 12b of vehicle compartment 12. According to an alternative embodiment of the present invention, cargo support arm 114 may be in a stored position such that cross member 114c is adjacent a side portion 12c, 12d of the vehicle compartment 12.

According to embodiments of the present invention, the arm 114 may have more than one operative positions. For example, the arm 114 may be positioned at any angle relative to the floor 13.

The illustrated arm 114 is configured to support the load floor 30 in an open position (FIG. 2B) when in an operative position such that user access to the storage compartment 24 is permitted. In the illustrated embodiment, a pair of pins 36 extend from respective edge portions 34b, 34c of panel 34. Each pin 36 is configured to be slidably received within a respective slot 37 formed in each support member 114a, 114b. The illustrated slots 37 each have a generally "S-shaped" configuration; however, slots having various configurations may be utilized in accordance with embodiments of the present invention. Each slot 37 has a first portion 37a and a second portion 37b. A user slides a respective pin 36 into a slot 37 at slot first portion 37a and moves the pin 36 (and, thus, panel 34) to slot position 37b whereby the panel 34 is supported in an open position. The arm 114 is configured to maintain the load floor 30 in an open position when the arm 114 is in an operative position, as illustrated in FIG. 2B.

In addition, the pins 36 of panel 34 may be engaged within slots 37 when the load floor is in a closed position. Movement of arm 114 to an operative position moves panel 34 to a open position.

Figure 3:
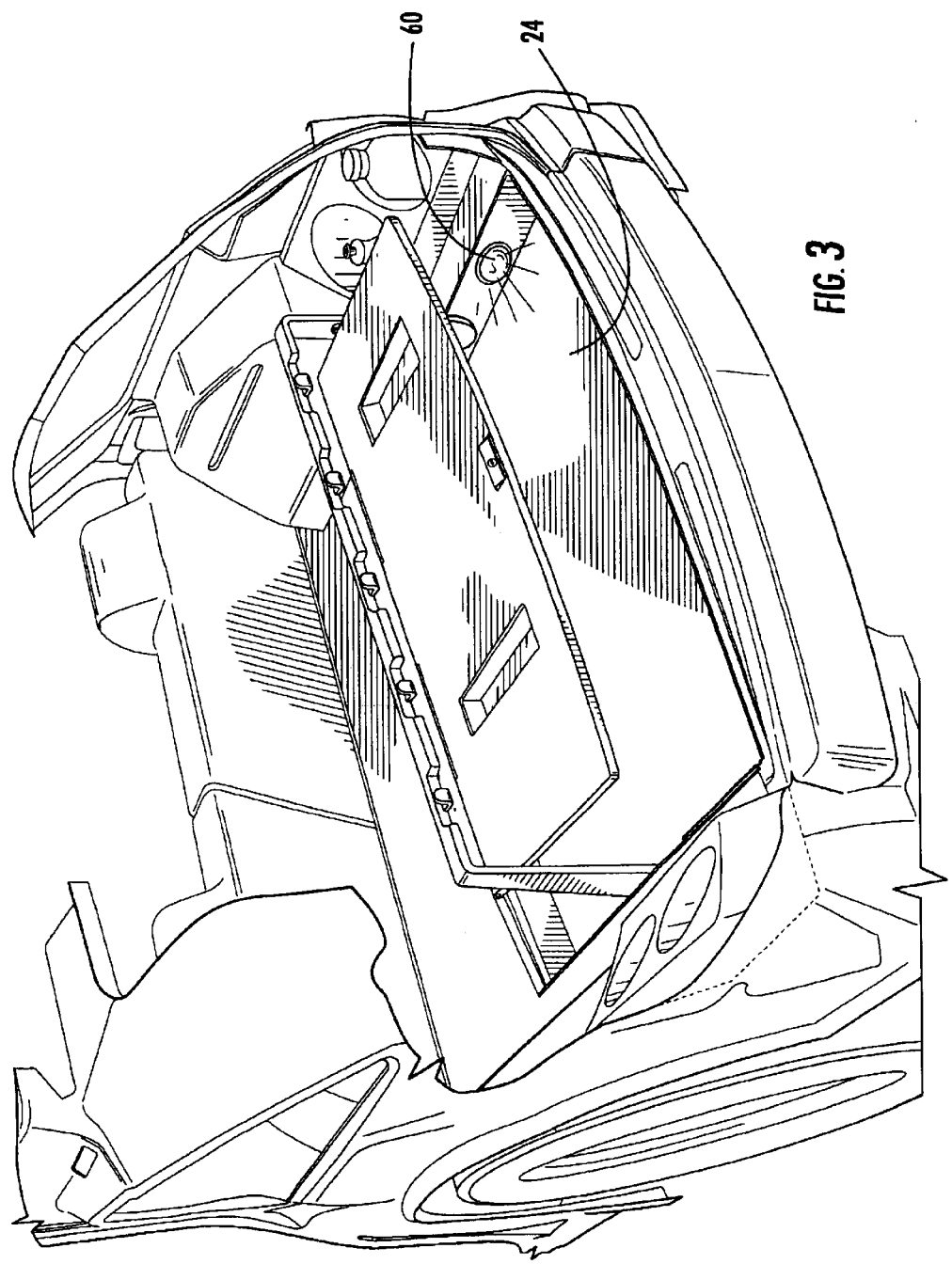

Additional embodiments of the present invention are illustrated in FIGS. 3–6. In FIG. 3, a light 60 is disposed within the storage compartment 24 of the cargo management apparatus 110 of FIGS. 2A–2B. The light 60 is configured to illuminate the storage compartment 24. Light 60 may be configured to turn on when the load floor 30 is moved to an operative position. Alternatively or in addition to, a user-actuated switch may be provided. A plurality of lights may be utilized in accordance with alternative embodiments of the present invention.

Figure 4:
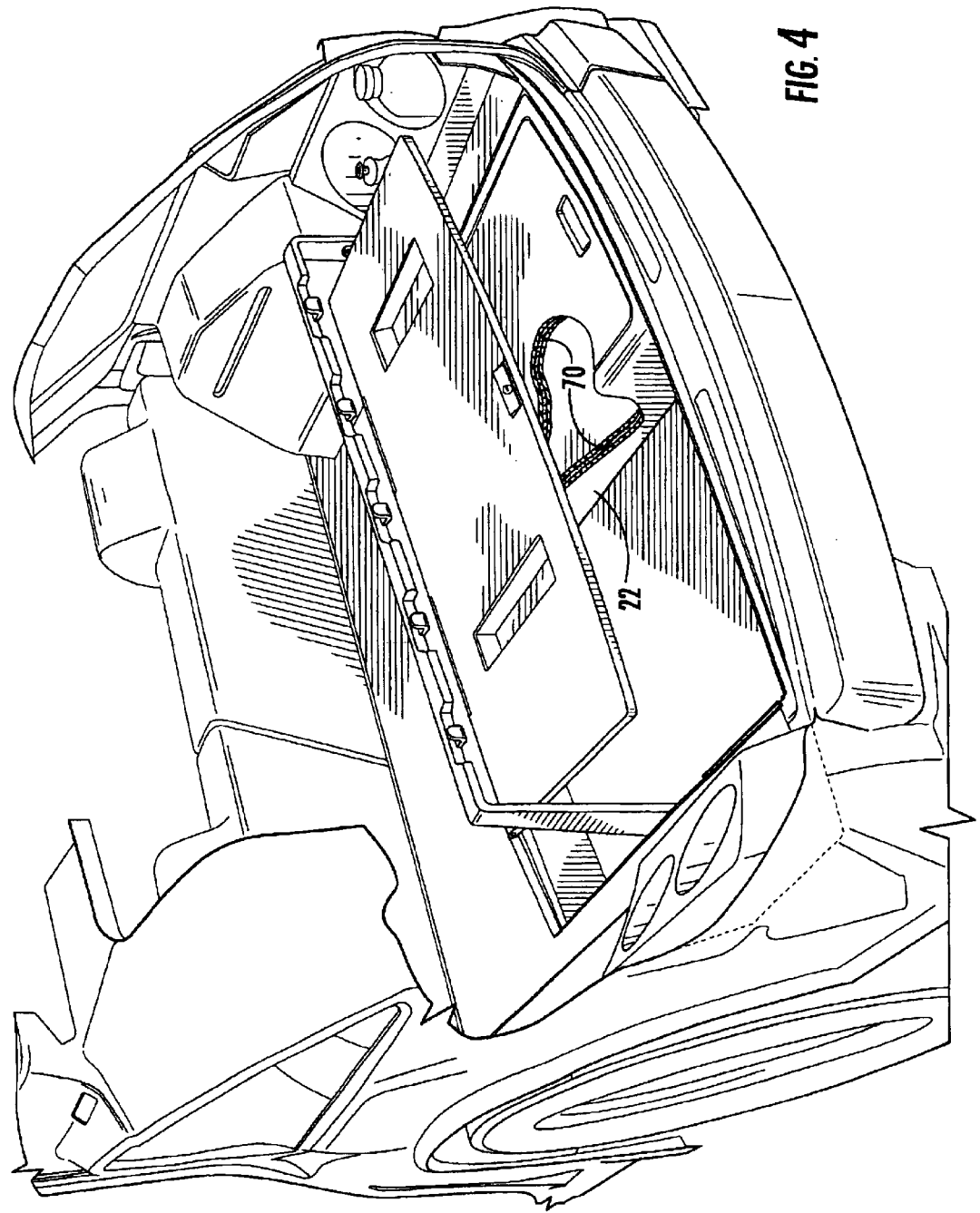

In FIG. 4, one or more of the storage compartment walls 22 of the cargo management apparatus 110 contain thermal insulation material 70 such that the storage compartment 24 can serve as a food and beverage cooler. Various types of thermal insulation material(s) may be utilized. Thermal insulating materials are well understood by those skilled in the art and need not be described further herein.

Figure 5:
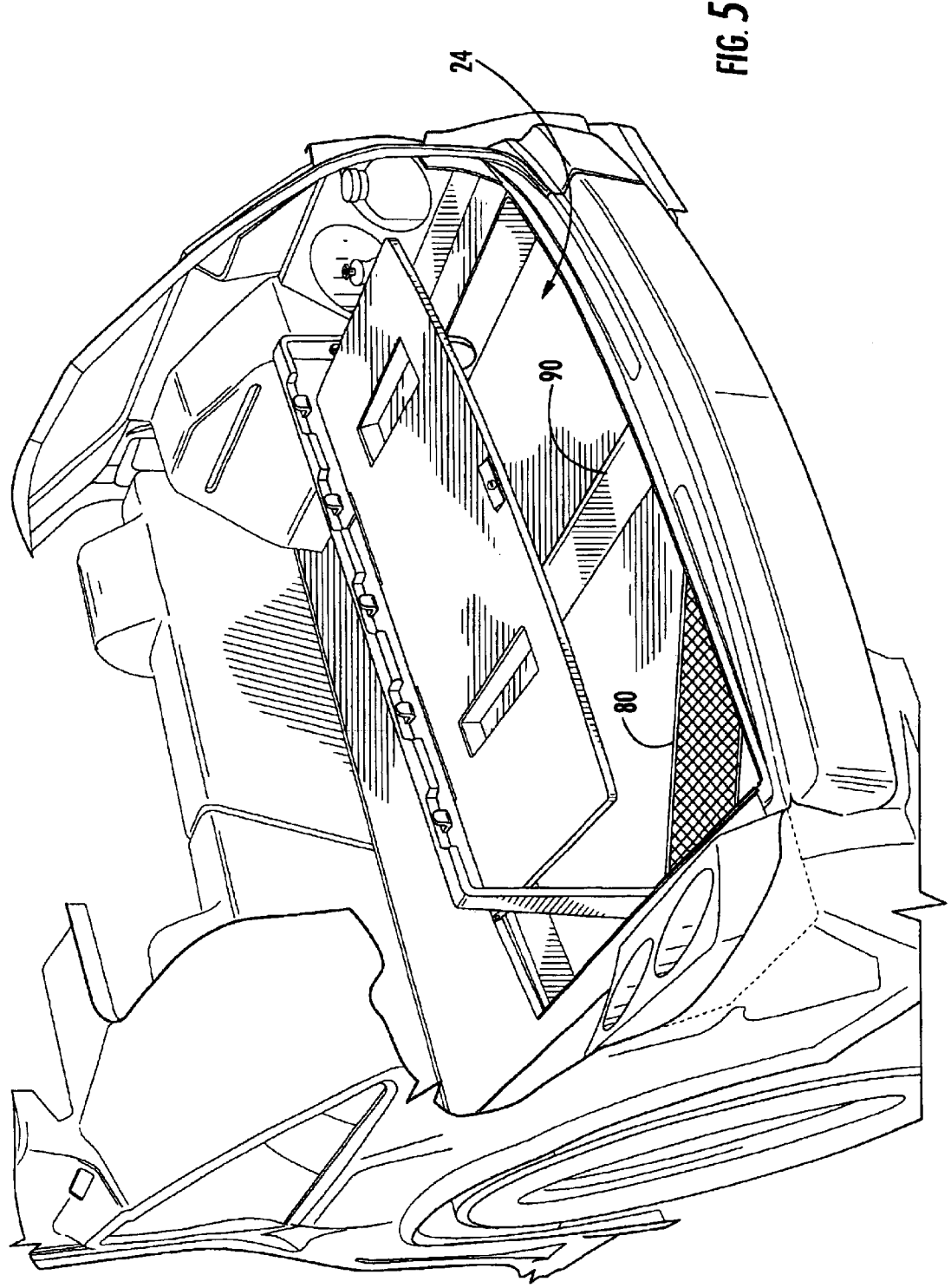

In FIG. 5, cargo netting 80 and one or more partitions 90 for restraining movement of articles stored within the storage compartment 24 are provided.

In FIG. 6, a privacy shade 100 that is configured to shield articles from view is operably associated with arm 14 of FIGS. 1A–1B and is movable between an open position exposing portions of the storage compartment 12 and a closed position covering one or more portions of the storage compartment 12.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cargo management apparatus for use within a vehicle compartment having a floor, the apparatus comprising:

a housing disposed within the floor, wherein the housing comprises walls that define a storage compartment;

a load floor operably secured to the housing for movement between a closed position and at least one open position, wherein the load floor overlies the storage compartment when in the closed position and permits user access to the storage compartment when in an open position, wherein a pin extends from a portion of the load floor;

a cargo support arm movably secured to the vehicle compartment and movable between a stored position and at least one operative position, wherein the cargo support arm is positioned adjacent to the floor when in the stored position, wherein the cargo support arm extends outwardly from the floor and above the load floor for convenient use thereof by a user when the cargo support arm is in an operative position, and wherein the cargo support arm comprises a slot that slidably receives the pin therein such that the cargo support arm supports the load floor in an open position when the cargo support arm is moved to an operative position; and at least one projection extending from the cargo support arm that is configured to support at least one loaded shopping bag by the handles thereof and to maintain the at least one loaded shopping bag in an upright position during operation of the vehicle.

2. The apparatus of claim 1, wherein the cargo support arm is substantially flush with the floor when in the stored position.

3. The apparatus of claim 1, wherein the cargo support arm has a generally U-shaped configuration and comprises a pair of members, wherein each member is movably secured within the vehicle compartment.

4. The apparatus of claim 1, wherein the at least one projection comprises a plurality of projections in adjacent, spaced-apart relationship.

5. The apparatus of claim 1, wherein the load floor comprises a pair of movable panels pivotally connected to each other.

6. The apparatus of claim 1, wherein the load floor comprises at least one recessed portion formed therein for receiving and supporting objects.

7. The apparatus of claim 1, further comprising a locking mechanism configured to maintain the load floor in the closed position and to prevent unauthorized opening of the load floor.

8. The apparatus of claim 1, further comprising a light disposed within the storage compartment that is configured to illuminate the storage compartment.

9. The apparatus of claim 1, wherein the storage compartment walls comprise thermal insulation material such that the storage compartment can serve as a food and beverage cooler.

10. The apparatus of claim 1, further comprising a cargo net disposed within the storage compartment for removably retaining items within the storage compartment.

11. The apparatus of claim 1, further comprising at least one partition disposed within the storage compartment.

12. The apparatus of claim 1, further comprising a security shade operably associated with the storage compartment and movable between an open position exposing the storage compartment and a closed position covering at least one portion of the storage compartment.

13. A cargo management apparatus for use within a vehicle compartment having a floor, the apparatus comprising:
    a housing disposed within the floor, wherein the housing comprises walls that define a storage compartment;
    a load floor operably secured to the housing for movement between a closed position and at least one open position, wherein the load floor overlies the storage compartment when in the closed position and permits user access to the storage compartment when in an open position, wherein the load floor comprises a pair of movable panels pivotally connected to each other, and wherein a pin extends from one of the panels;
    a cargo support arm movably secured to the housing and movable between a stored position and at least one operative position, wherein the cargo support arm is positioned adjacent to the housing when in the stored position, and wherein the cargo support arm extends outwardly from the housing and above the load floor for convenient use thereof by a user when the cargo support arm is in an operative position, and wherein the cargo support arm comprises a slot that slidably receives the pin therein such that when the cargo support arm is moved to an operative position the load floor is moved to an open position; and
    at least one projection extending from the cargo support arm that is configured to support at least one loaded shopping bag by the handles thereof and to maintain the at least one loaded shopping bag in an upright position during operation of the vehicle.

14. The apparatus of claim 13, wherein the cargo support arm is substantially flush with the housing when in the stored position.

15. The apparatus of claim 13, wherein the cargo support arm has a generally U-shaped configuration and comprises a pair of members, wherein each member is movably secured to the housing.

16. The apparatus of claim 13, wherein the at least one projection comprises a plurality of projections in adjacent, spaced-apart relationship.

17. The apparatus of claim 13, wherein the cargo support arm slot is configured to maintain the load floor in an open position when the cargo support arm is in an operative position.

18. The apparatus of claim 13, wherein the load floor comprises at least one recessed portion formed therein for receiving and supporting objects.

19. The apparatus of claim 13, further comprising a locking mechanism configured to maintain the load floor in the closed position and to prevent unauthorized opening of the load floor.

20. The apparatus of claim 13, further comprising a light disposed within the storage compartment that is configured to illuminate the storage compartment.

21. The apparatus of claim 13, wherein the storage compartment walls comprise thermal insulation material such that the storage compartment can serve as a food and beverage cooler.

22. The apparatus of claim 13, further comprising a cargo net disposed within the storage compartment for removably retaining items within the storage compartment.

23. The apparatus of claim 13, further comprising at least one partition disposed within the storage compartment.

24. The apparatus of claim 13, further comprising a security shade operably associated with the storage compartment and movable between an open position exposing the storage compartment and a closed position covering and least one portion of the storage compartment.

* * * * *